United States Patent
Viry et al.

(10) Patent No.: US 11,081,939 B2
(45) Date of Patent: Aug. 3, 2021

(54) SHAFT FOR A ROTATING ELECTRICAL MACHINE, AND ROTOR AND METHOD FOR PRODUCING SUCH A ROTOR

(71) Applicant: GE Energy Power Conversion Technology Limited, Warwickshire (GB)

(72) Inventors: Yannick Viry, Champigneulles (FR); Fabrice Herbin, Champigneulles (FR); Benoit Schnabel, Champigneulles (FR); Frederic Violin, Champigneulles (FR); Adrien Huillet, Champigneulles (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 77 days.

(21) Appl. No.: 16/428,919

(22) Filed: May 31, 2019

(65) Prior Publication Data
US 2019/0386544 A1    Dec. 19, 2019

(30) Foreign Application Priority Data

May 31, 2018 (FR) ...................................... 1854708

(51) Int. Cl.
*H02K 11/00* (2016.01)
*H02K 3/51* (2006.01)
*H02K 17/16* (2006.01)

(52) U.S. Cl.
CPC .......... *H02K 11/0094* (2013.01); *H02K 3/51* (2013.01); *H02K 17/165* (2013.01); *H02K 2203/06* (2013.01)

(58) Field of Classification Search
CPC .... H02K 11/0094; H02K 3/51; H02K 17/165; H02K 2203/06
See application file for complete search history.

(56) References Cited

U.S. PATENT DOCUMENTS

| | | | | |
|---|---|---|---|---|
| 3,524,090 A * | 8/1970 | Sark | ........................ | H01R 39/34 310/71 |
| 4,066,921 A | 1/1978 | Blank | | |
| 5,122,696 A * | 6/1992 | Shih | ........................ | H02K 3/51 310/270 |
| 5,358,432 A * | 10/1994 | Shih | ........................ | H01R 13/17 439/655 |
| 6,347,968 B1 * | 2/2002 | Hamilton | ............. | H01R 13/187 439/801 |
| 6,664,679 B2 | 12/2003 | Whitener et al. | | |
| 10,447,105 B2 * | 10/2019 | Poretti | ................... | F04D 13/10 |
| 2016/0380520 A1 * | 12/2016 | Word | ..................... | H02K 15/02 29/598 |

FOREIGN PATENT DOCUMENTS

DE           10256974 A1    6/2004

OTHER PUBLICATIONS

French Search Report from FR Appl. No. 18 54708, dated Mar. 29, 2019.

* cited by examiner

*Primary Examiner* — Jeremy A Luks
(74) *Attorney, Agent, or Firm* — Wood IP LLC (57) ABSTRACT

The shaft for a rotating electrical machine comprises at least one housing element (8a, 8b, 8c) extending in an axial direction (A) and emerging outwards in a radial direction, with one side of the housing element emerging outwards in an axial direction, and with the housing being able to accommodate at least one insulated electrical conductor (6) and a spacer (9a, 9b, 9c).

14 Claims, 7 Drawing Sheets

SHAFT FOR A ROTATING ELECTRICAL MACHINE, AND ROTOR AND METHOD FOR PRODUCING SUCH A ROTOR

This invention relates to a shaft for an electrical machine rotor and also relates to such a rotor. This invention also relates to an electrical machine comprising such a rotor. This invention also relates to a method for making such a rotor.

The shaft of an electrical rotating machine may be drilled in its center to enable insulated electrical power supply cables to pass through.

The cross section through which the cables pass into the shaft is limited by the minimum thickness of material required for the shaft to have sufficient rigidity to position the bending and torsion modes of a rotor incorporating the shaft outside the range of the rotor's operating speeds, and so as to limit the deflection of the shaft in motor or generator mode.

The power of a rotating electrical machine depends, in particular, on the amperage of the current flowing through the cables.

The greater the electrical power provided by the machine, the thicker the cable cross section required to enable the current to flow.

The power provided by the machine is therefore limited by the cross section of the power supply cables.

For an electrical machine including, for example, a shaft with an outside diameter of 180 mm, the maximum feasible cross section of the cables is sized for a maximum current of 1,000 amperes.

Furthermore, electrical cables with large cross-sections have a curvature radius that requires a significant clearance volume.

It is therefore proposed to compensate for the disadvantages due to passing electrical cables through the drilled shaft of the rotor of a rotating electrical machine in accordance with the state of the art, in particular by increasing the amperage of the currents flowing through the shaft and by reducing the curvature radius of the electrical cables.

On the basis of the foregoing, a shaft for a rotating electrical machine, according to a first aspect, is proposed.

The shaft comprises at least one housing element extending in an axial direction and emerging outwards in a radial direction, with one side of the housing element emerging outwards in an axial direction, and with the housing element being able to accommodate at least one insulated electrical conductor and a spacer.

According to a first embodiment, the housing element is in the form of a groove, with a cross section perpendicular to the axial direction that comprises a substantially rectangular portion emerging outwards in the radial direction.

According to a second embodiment, the housing element is in the form of a groove, with a cross section perpendicular to the axial direction that comprises a first portion, substantially rectangular in form, emerging onto a second portion, substantially trapezoidal in form, with the second portion emerging outwards in a radial direction.

Preferably, the second portion, which is substantially trapezoidal in form, includes a small base in a radially outer position and a large base, with the small base positioned outside the large base in the radial direction so that an insulated electrical conductor can be inserted into the first portion in a radial direction of the shaft, through the second portion.

Advantageously, the number and dimensions of the housing elements are determined so that the shaft has sufficient rigidity to transmit a predetermined torque when the rotating electrical machine is operating in motor or generator mode, so that the bending and torsion modes of a rotor incorporating the shaft are outside the range of the rotor's operating speeds, and so as to limit the deflection of the shaft to a predetermined value.

According to another characteristic, the shaft comprises at least two housing elements, with the angles in the axial direction between the two centers of mass of two adjacent housing elements being equal in value.

According to another aspect, a rotor for a rotating electrical machine is proposed that comprises a shaft as defined previously and insulated electrical conductors so that each portion comprises the same number of electrical conductors so as to fill each portion.

According to a first embodiment, the shaft comprises one portion and the rotor further comprises a ring inserted onto the shaft in the axial direction so that the shaft and the ring are secured together by shrink-fitting, with each portion further comprising a spacer positioned between the insulated electrical conductor and the ring so as to prevent the conductor from moving in the portion.

According to a second embodiment, the shaft comprises a first portion and a second portion, with the second portion further comprising a spacer so as to prevent the conductors from moving in the portion and so that a clearance space separates the free end of the spacer from an outer periphery of the shaft.

Advantageously, the first portion comprises insulated electrical conductors, separated by the spacer extending into the first portion.

Preferably, the insulated electrical conductors comprise metal (in particular, copper) bars, covered with an electrical insulator or electrical cables covered with an electrical insulator.

According to another aspect, a rotating electrical machine is proposed that comprises a rotor as defined previously.

According to a further aspect, a method for producing a rotor for a rotating electrical machine is proposed.

The insulated electrical conductors are inserted into the first portions of a shaft in one of the shaft's radial directions.

According to a first method of implementation, a spacer is inserted into each of the first portions in a radial direction so that the conductors are prevented from moving in the first portion, a ring is inserted onto the shaft so that the shaft and the ring are secured together by shrink-fitting, the outside of the ring is machined, then the inner ring of a bearing is inserted onto this ring by shrink-fitting.

According to a second method of implementation, a spacer is inserted into each of the second portions in an axial direction so that the conductors are prevented from moving in the first portion and so that a clearance space separates the free end of the spacer from an outer periphery of the shaft, and the inner ring of a bearing is inserted onto the shaft by shrink-fitting.

Other characteristics and advantages of the invention will emerge on reading the following description of the embodiments of the invention, provided solely by way of non-limiting examples and with reference to the diagrams where.

Figure 1:
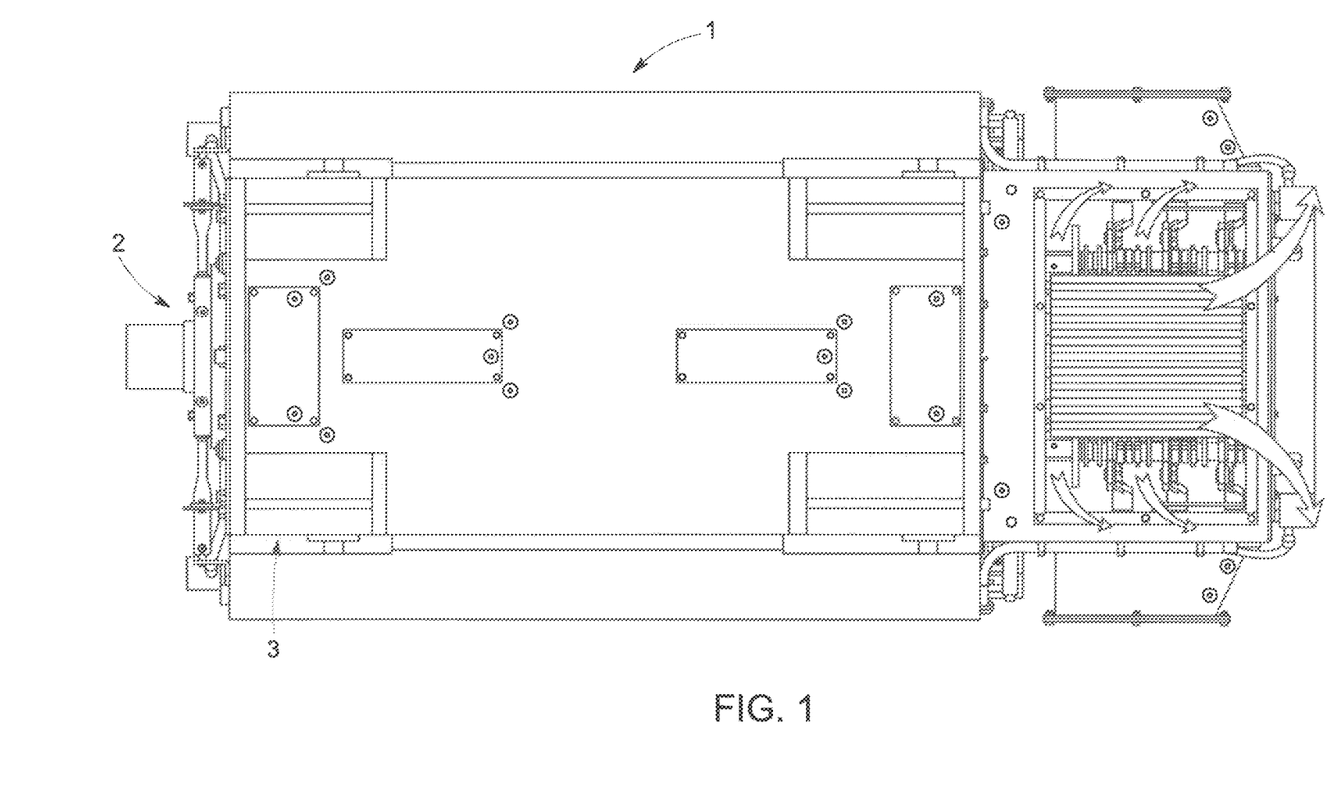
FIG. 1 illustrates an embodiment of a rotating electrical machine.

Reference is made to FIG. 1, which illustrates a rotating electrical machine 1 comprising a rotor 2 inserted into a frame 3.

The machine 1 may, for example, be a synchronous machine or polyphase machine.

In what follows, the machine 1 is a three-phase rotating electrical machine.

Figure 2:
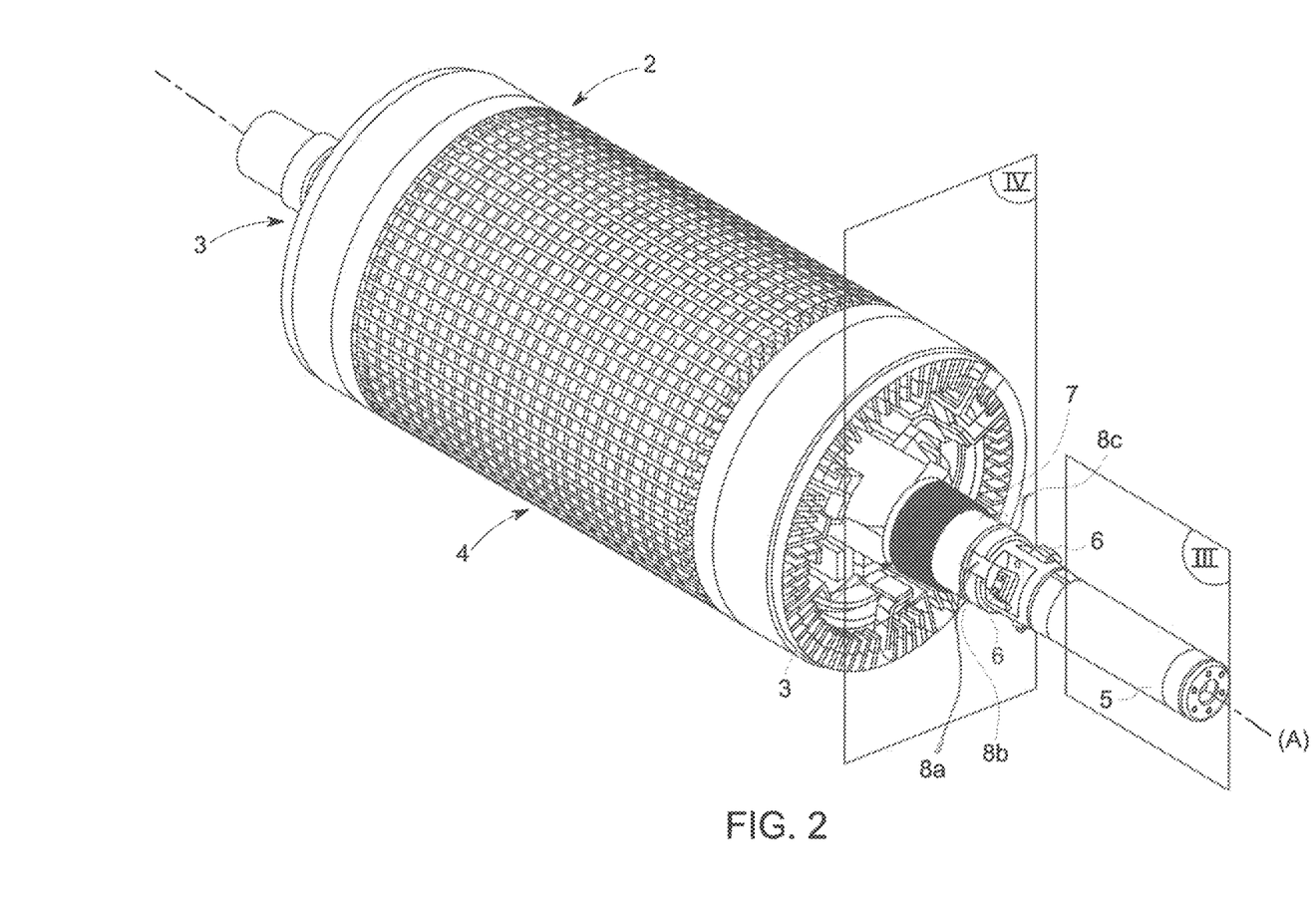
FIGS. 2, 3 and 4 illustrate a first embodiment of a rotor.
Figure 3:
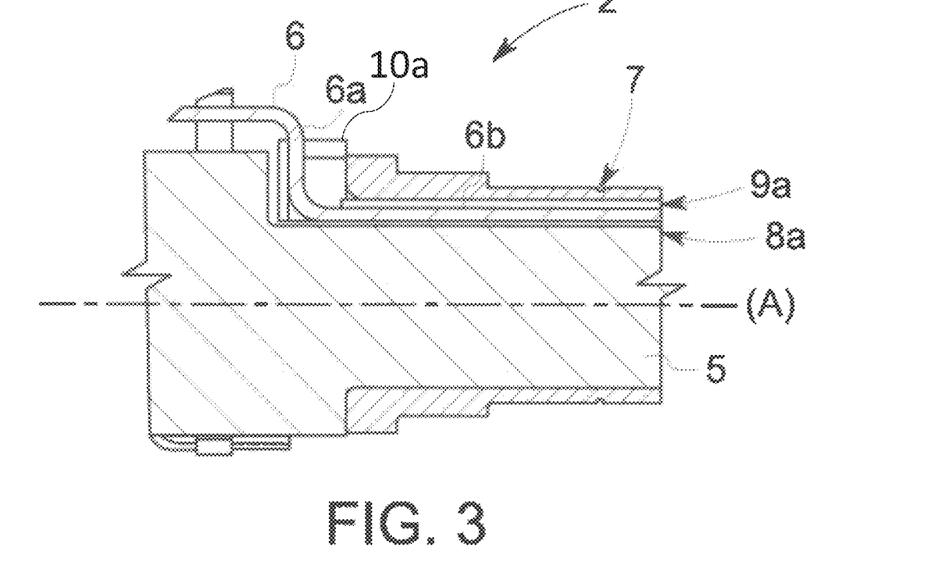
Figure 4:
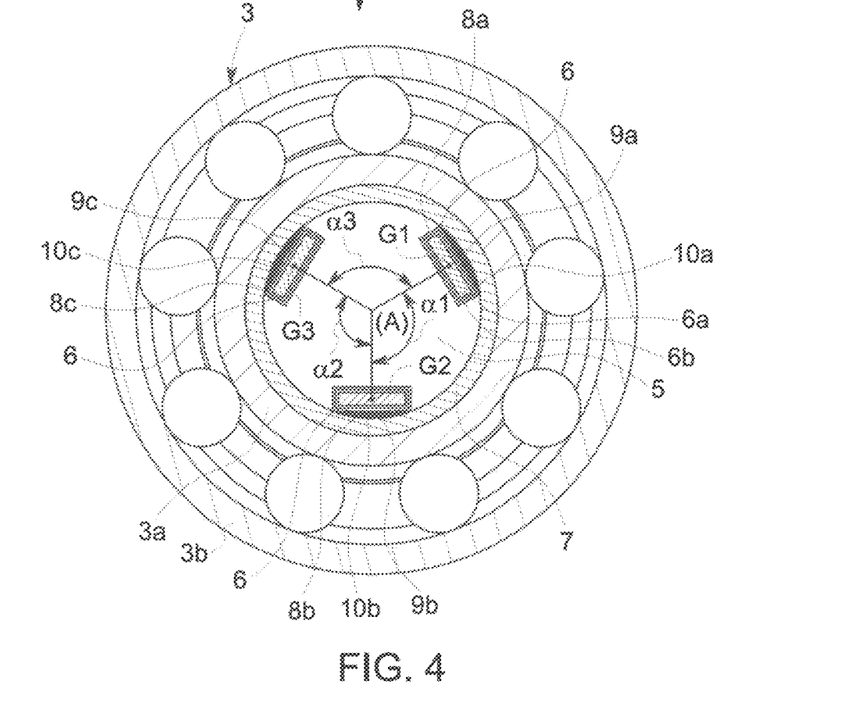

Reference is now made to FIGS. 2, 3 and 4, which illustrate a first embodiment of the rotor 2.

Particular reference is made to FIG. 2, which illustrates the rotor 2 comprising bearings 3 and a series of electrical steel sheets and windings 4 surrounding a shaft 5.

The bearings 3 may, for example, be needle bearings, roller bearings or ball bearings as presented here or be formed of a series of bearings.

The bearing 3 comprises an inner ring 3a and an outer ring 3b.

The shaft 5 comprises an axis (A) aligned with the rotational axis of the shaft, insulated electrical conductors 6, at least one ring 7, and three housing elements 8a, 8b and 8c extending in the axial direction (A) and emerging outwards in a radial direction of the shaft 5.

The shaft 5 is made from a metallic material, for example from steel.

FIGS. 3 and 4 respectively present a partial cross section of the rotor 2 in a plane (III) through the axis (A) and a partial cross section of the rotor 2 in a plane (IV) perpendicular to the axis (A) and through the center of a bearing 3.

The three housing elements 8a, 8b and 8c are identical.

Each housing element 8a, 8b and 8c is in the form of a groove, with a cross-section perpendicular to the axial direction (A) that comprises a portion 10a, 10b and 10c, substantially rectangular in form, emerging outwards in the radial direction and one side of the housing element emerging outwards in the axial direction.

Each portion 10a, 10b and 10c accommodates a conductor 6.

Here, each conductor 6 corresponds to a different phase of the three-phase machine 1.

The number and dimensions of the housing elements 8a, 8b and 8c are determined so that the shaft 5 has sufficient rigidity to transmit a predetermined torque when the machine 1 is operating in motor or generator mode, so that the bending and torsion modes of the rotor 2 are outside the range of the rotor's operating speeds, and so as to limit the deflection of the shaft 5 to a predetermined value.

The predetermined deflection value is determined according to the air gap distance of the machine 1.

For example, the predetermined value is equal to 10% of the air gap distance.

The number and dimensions of the housing elements 8a, 8b and 8c are determined, for example, using a topological optimization algorithm.

According to other embodiments, the shaft 5 may comprise two or more housing elements.

The insulated electrical conductor 6 comprises a conductive metal bar 6a, for example made from copper, covered with an electrical insulator 6b.

According to another embodiment, the conductor 6 comprises at least one electrical cable covered with an electrical insulator.

The ring 7 is inserted onto the shaft in the axial direction (A) so that an inner perimeter of the ring is secured onto the shaft.

The ring 7 is inserted onto the shaft 5 by shrink-fitting.

Each portion 10a, 10b and 10c further comprises a spacer 9a, 9b and 9c positioned between the insulated electrical conductor 6 and the ring 7 so as to prevent the conductor 6 from moving in the portion.

The spacer 9a, 9b and 9c is sized to compensate for any slack between the ring 7 and the conductor 6 so that the conductor 6 is secured in position within the housing element 8a, 8b and 8c when the ring surrounds the shaft 5.

The spacer 9a, 9b and 9c prevents the conductor 6 from moving as a result of centrifugal forces when the rotor 2 is rotating. Movement of the conductor 6 would otherwise risk damaging the electrical insulator 6b through abrasion, resulting in unwanted electric contact between the conductive bar 6a and the shaft 5.

An outer perimeter of the ring 7 and the inner ring 3a of the bearing 3 are secured together so that the shaft 5 rotates in relation to the outer ring 3b.

According to another embodiment, each housing element 8a, 8b and 8c may comprise several insulated electrical conductors 6 so as to fill the portion 10a, 10b and 10c, with each portion comprising the same number of conductors 6.

The three housing elements 8a, 8b and 8c are positioned on the shaft 5 so that the angles α1, α2 and α3 in the radial direction (A) respectively between the two centers of mass G1 and G2, G2 and G3, G3 and G1 of two adjacent portions 10a and 10b, 10b and 10c, 10c and 10a are equal in value.

As shaft 5 comprises three portions 10a, 10b and 10c, the value of each angle α1, α2 and α3 is equal to 120°.

The uniform angular distribution of the housing elements 8a, 8b and 8c in the shaft 5 helps ensure its balance.

The rotor 2 is balanced so that vibratory phenomena damaging, in particular, the bearings 3 are minimized.

Figure 5:
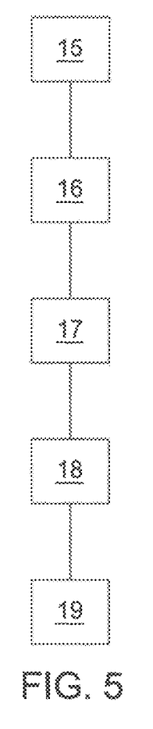
FIG. 5 illustrates a method for producing a rotor according to the first embodiment.

Reference is now made to FIG. 5, which illustrates a method for producing the rotor 2 according to the first embodiment.

In a step 15, a conductor 6 is inserted in one of the shaft's radial directions 5 into each portion 10a, 10b and 10c of the shaft 5 from the side of the housing element emerging outwards.

In a step 16, a spacer 9a, 9b and 9c is inserted in the radial direction into each portion 10a, 10b and 10c so as to prevent each conductor 6 from moving in the portions.

In a step 17, the ring 7 is inserted by shrink-fitting onto the shaft 5.

In a step 18, the outer perimeter of the ring 7 is machined so that, in a later step, a bearing 3 can be inserted onto the outer perimeter of the ring 7.

In a step 19, the inner ring 3a of the bearing 3 is inserted by shrink-fitting onto the ring 7.

Figure 6:
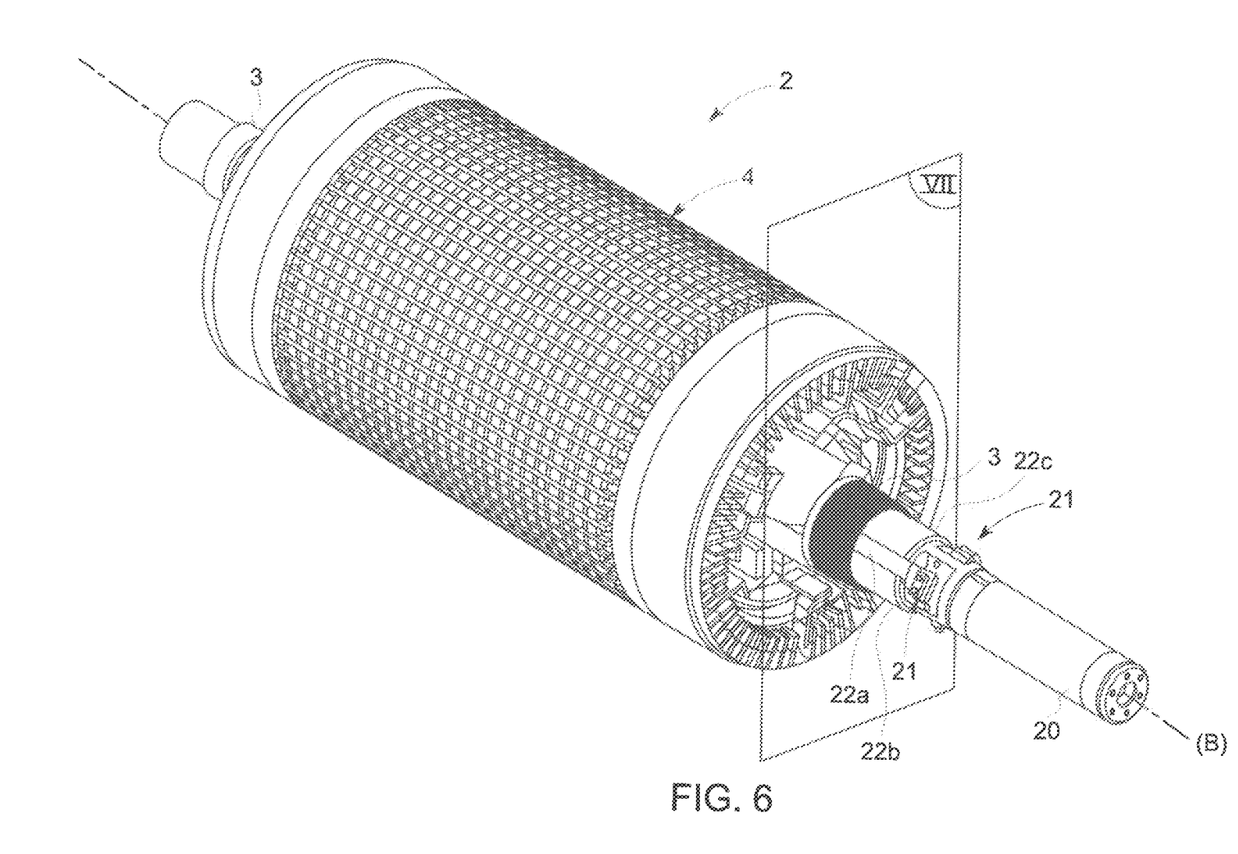
FIGS. 6 and 7 illustrate a second embodiment of a rotor.
Figure 7:
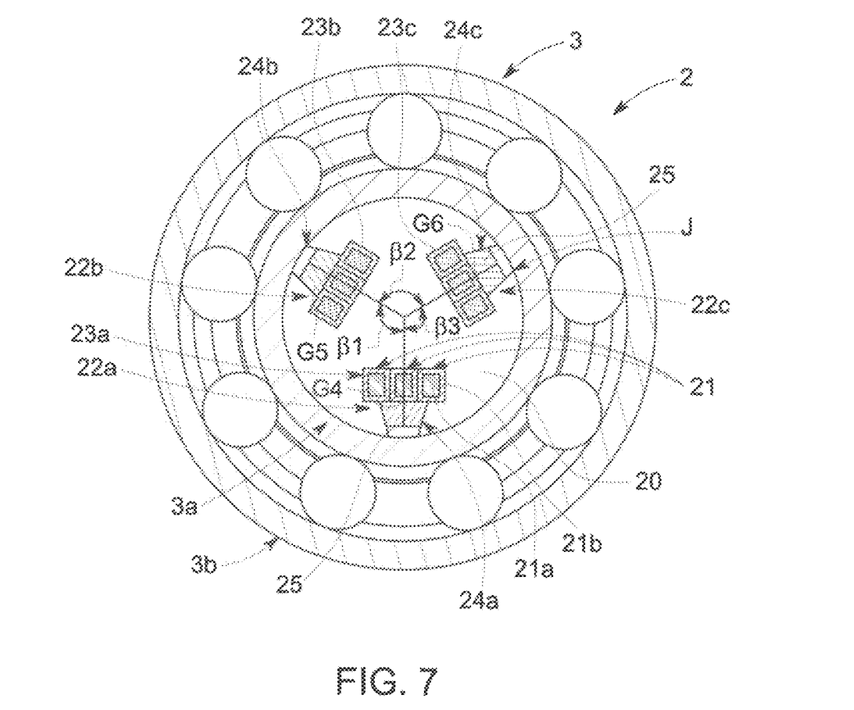

Reference is now made to FIGS. 6 and 7, which illustrate a second preferential embodiment of the rotor 2.

Particular reference is made to FIG. 6, which illustrates the rotor 2 comprising the bearings 3 and a series of electrical steel sheets and windings 4 surrounding a shaft 20.

The shaft 20 comprises an axis (B) aligned with the rotational axis of the shaft, insulated electrical conductors 21 and three housing elements 22a, 22b and 22c extending in the axial direction (B) and emerging outwards in a radial direction of the shaft 20.

The shaft 20 is made from a metallic material, for example from steel.

FIG. 7 presents a partial cross section of the rotor 2 in a plane (VII) perpendicular to the axis (B) and through the center of a bearing 3.

The three housing elements 22a, 22b and 22c are identical.

Each housing element 22a, 22b and 22c is in the form of a groove, with a cross section perpendicular to the axial direction (B) that comprises a first portion 23a, 23b and 23c, substantially rectangular in form, emerging onto a second portion 24a, 24b and 24c, substantially trapezoidal in form, with the second portion emerging outwards in a radial direction.

One side of each of the housing elements emerges outwards in an axial direction (B).

The second portion 24a, 24b and 24c is substantially trapezoidal in form and includes a small base in a radially outer position and a large base, with the small base positioned outside the large base in the radial direction.

Each first portion 23a, 23b and 23c accommodates the same number of insulated electrical conductors 21 so as to fill the first portion, for example three conductors 21, as presented.

The dimension of the small base is determined so that an insulated electrical conductor 21 can be inserted into the first portion 23a, 23b and 23c in a radial direction of the shaft 20 through the second portion 24a, 24b and 24c.

The number and dimensions of the housing elements 22a, 22b and 22c are determined so that the shaft 5 has sufficient rigidity to transmit a predetermined torque when the machine 1 is operating in motor or generator mode, so that the bending and torsion modes of the rotor 2 are outside the range of the rotor's operating speeds, and so as to limit the deflection of the shaft 20 to a predetermined value.

The predetermined deflection value is determined according to the air gap distance of the machine 1.

For example, the predetermined value is equal to 10% of the air gap distance.

The number and dimensions of the housing elements 22a, 22b and 22c are determined, for example, using a topological optimization algorithm.

According to other embodiments, the shaft 20 may comprise two or more housing elements.

The insulated electrical conductor 21 comprises a conductive metal bar 21a, for example made from copper, covered with an electrical insulator 21b.

A spacer 25 is inserted into each second portion 24a, 24b and 24c so as to prevent the conductors 21 from moving in the first portion 23a, 23b and 23c and so that a clearance space J separates the free end of the spacer from an outer periphery of the shaft 20.

The spacer 25 prevents the conductors 21 from moving in the first portion when the rotor 2 is rotating.

If there was no spacer 25, movement of the conductor 21 would risk damaging the electrical insulator 21b, resulting in unwanted electric contact between the conductive bar 21a and the shaft 20.

An outer perimeter of the shaft 20 and the inner ring 3a of the bearing 3 are secured together by shrink-fitting so that the shaft 20 rotates in relation to the outer ring 3b.

The three housing elements 22a, 22b and 22c are positioned on the shaft 20 so that the angles β1, β2 and β3 in the radial direction (B) respectively between the two centers of mass G4 and G5, G5 and G6, G6 and G4 of two adjacent housing elements 22a and 22b, 22b and 22c, 22c and 22a are equal in value.

As shaft 20 comprises three housing elements 22a, 22b and 22c, the value of each of the angles β1, β2 and β3 is equal to 120°.

The uniform angular distribution of the housing elements 22a, 22b and 22c in the shaft 20 helps ensure its balance.

The rotor 2 is balanced so that vibratory phenomena damaging, in particular, the bearings 3 are minimized.

Figure 8:
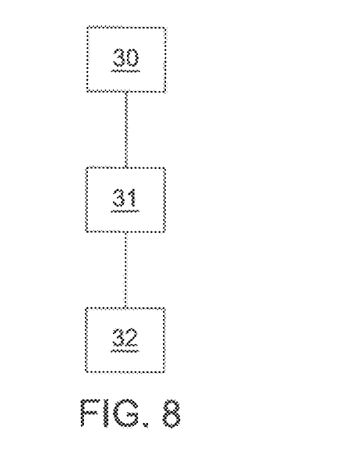
FIG. 8 illustrates a method for producing a rotor according to the second embodiment.

Reference is now made to FIG. 8, which illustrates a method for producing the rotor 2 according to the second embodiment.

In a step 30, the conductors 21 are inserted in one of the shaft's radial directions 20 into each first portion 23a, 23b and 23c of the shaft 20 from the side of the housing element emerging outwards.

In a step 31, a spacer 25 is inserted in the axial direction (B) into each second portion 24a, 24b and 24c so as to prevent each conductor 21 from moving in the first portions and so that a clearance space J separates the free end of the spacer from an outer periphery of the shaft 20.

The spacer 25 is inserted from the side of the housing element emerging outwards.

In a step 32, the inner ring 3a of the bearing 3 is inserted by shrink-fitting onto the shaft 20.

Figure 9:
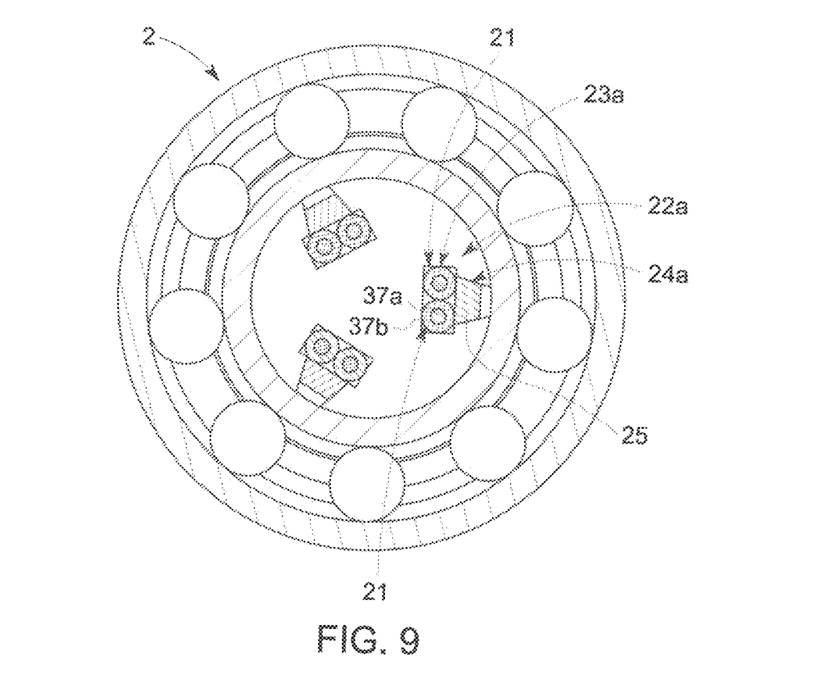
FIG. 9 illustrates a second embodiment of an insulated electrical conductor.

According to another embodiment of the insulated electrical conductor 21 presented in FIG. 9, the conductor 21 comprises at least one electrical cable 37a, for example made from copper, covered 30 with an electrical insulator 37b.

Here, each first portion 23a, 23b and 23c comprises two conductors 21.

The cross section of the cables and the number of cables are chosen so as to optimize the cross section through which currents pass and to minimize the curvature radius of the cables.

A compromise between these two criteria is to be found.

The cables are used, for example, when the rotor requires low currents.

Figure 10:
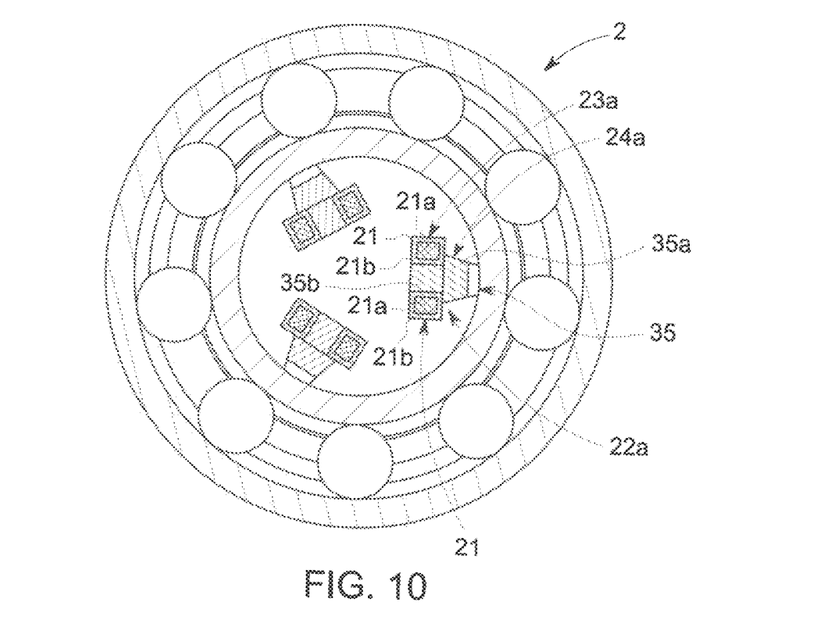
FIG. 10 illustrates a second embodiment of a spacer.

Reference is now made to FIG. 10, which illustrates another embodiment of the spacer 25.

The first portion 23a, 23b and 23c of the housing element comprises two conductors 21.

The spacer 35 comprises a first part 35a identical to the spacer 25 described previously and a second part 35b extending into the first portion 23a, 23b and 23c so that the two insulated electrical conductors are separated by the spacer 35.

Advantageously, the housing elements in the shaft make it possible to increase the cross sections through which current passes without compromising the shaft's rigidity while also reducing or eliminating the space required to bend the cables.

For example, in the case of a shaft with an outside diameter of 180 mm of a 4 MW rotating electrical machine, currents of up to 1,700 amperes can flow through the shaft.

Furthermore, in the second embodiment, if an insulated electrical conductor is defective, it is only necessary to remove the bearings and the spacer which is positioned above the defective conductor in order to access the said conductor. In this embodiment, a machining step is eliminated from the method for producing the rotor.

Finally, the conductive bars make it possible to optimize the cross section through which current flows by completely filling the portion of each of the housing elements, in contrast to cables, which leave empty spaces.

What is claimed is:

1. A shaft for a rotating electrical machine, comprising:
at least one housing element disposed external to the shaft and formed of a groove extending lengthwise in an axial direction of the shaft and having one side thereof extending outwards in a radial direction of the shaft, wherein the at least one housing element comprising a spacer and configured to accommodate at least one insulated electrical conductor and the spacer; and at least one ring to be inserted onto the shaft in the axial direction wherein the spacer is positioned between the at least one insulated electrical conductor and ring to compensate for space between the ring and the at least one insulated electrical conductor to prevent movement thereof.

2. The shaft according to claim 1, wherein the housing element is in comprises a cross section perpendicular to the axial direction and the one side thereof including a substantially rectangular portion extending outwards in the radial direction.

3. The shaft according to claim 1, wherein the housing element comprising a cross section perpendicular to the axial direction and including a first portion, substantially rectangular in form, extending onto a second portion, substantially trapezoidal in form, with the second portion extending outwards in a radial direction.

4. The shaft according to claim 3, wherein the second portion, which is substantially trapezoidal in form, includes a small base in a radially outer position and a large base, with the small base positioned outside the large base in the radial direction so that an insulated electrical conductor can be inserted into the first portion in a radial direction of the shaft, through the second portion.

5. The shaft according to claim 4, wherein the number and dimensions of the housing elements are determined so that the shaft has sufficient rigidity to transmit a predetermined torque when the rotating electrical machine is operating in motor or generator mode, so that the bending and torsion modes of a rotor incorporating the shaft are outside the range αof the rotor's operating speeds, and to limit the deflection of the shaft to a predetermined value.

6. The shaft according to claim 5, comprising at least two housing elements, with angles ($\alpha 1$, $\alpha.2$, $\alpha.3$, $\beta 1$, $\beta 2$, $\beta 3$) in the axial direction between two centers of mass of two adjacent housing elements being equal in value.

7. A rotor for a rotating electrical machine comprising a shaft, wherein the shaft comprising:
a plurality of housing elements disposed external to the shaft and formed of a groove extending lengthwise in an axial direction of the shaft and each having on side thereof extending outwards in a radial direction of the shaft, and each housing element comprising a spacer and a portion for accommodating at least one insulated electrical conductor and the spacer; and
wherein the rotor includes insulated electrical conductors so that each portion comprises the same number of electrical conductors so as to fill each portion.

8. The rotor according to claim 7, wherein the shaft comprises one portion and further comprising at least a ring inserted onto the shaft in the axial direction so that the shaft and the ring are secured together by shrink-fitting, with each portion further comprising the spacer positioned between the insulated electrical conductor and the ring so as to prevent the conductor from moving in the portion.

9. The rotor according to claim 7, wherein the shaft comprises a first portion and a second portion, with the second portion further comprising a spacer to prevent the conductors from moving in the portion, a clearance space separating a free end of the spacer from an outer periphery of the shaft.

10. The rotor according to claim 9, wherein the first portion comprises insulated electrical conductors separated by the spacer extending into the first portion.

11. The rotor according to claim 10, wherein the insulated electrical conductors comprise metal bars, covered with an electrical insulator or electrical cables covered with an electrical insulator.

12. A method for producing the rotor according to claim 7 for a rotating electrical machine comprising inserting, insulated electrical conductors into first portions of the shaft in the radial direction of the shaft.

13. The method according to claim 12, wherein the spacer is inserted into each of the first portions in a radial direction wherein the insulated electrical conductors are prevented from moving in the first portion, a ring being inserted onto the shaft so that the shaft and the ring are secured together by shrink-fitting, wherein the outside of the ring is machined, and an inner ring of a bearing is inserted onto the ring by shrink-fitting.

14. The method according to claim 12, further comprising:
inserting a spacer into each of the second portions in an axial direction, the insulated electrical conductors being prevented from moving in the first portion and a clearance space separating a free end of the spacer from an outer periphery of the shaft, and wherein an inner ring of a bearing is inserted onto the shaft by shrink-fitting.

* * * * *